J. H. VREELAND & C. H. LATHROP.

Improvement in Gage-Cocks for Steam-Boilers.

No. 131,799.  Patented Oct. 1, 1872.

Witnesses:
James L. Norris.
Parker H. Sweet, Jr.

Inventors:
J. H. Vreeland.
C. H. Lathrop.
Per Burke, Fraser & Osgood
Attys.

UNITED STATES PATENT OFFICE.

JACOB H. VREELAND, OF RUTHERFORD PARK, AND CHANCY H. LATHROP, OF JERSEY CITY; SAID VREELAND ASSIGNOR OF HIS RIGHT TO JAMES B. GRAHAM, OF JERSEY CITY, NEW JERSEY.

IMPROVEMENT IN GAGE-COCKS FOR STEAM-BOILERS.

Specification forming part of Letters Patent No. 131,799, dated October 1, 1872.

*To all whom it may concern:*

Be it known that we, C. H. LATHROP, of Jersey City, in the county of Hudson, and JACOB H. VREELAND, of Rutherford Park, in the county of Bergen and State of New Jersey, have invented an Improvement in Try-Cocks for Steam-Boilers, applicable also to other uses, of which the following is a specification:

The valves or cocks heretofore used for this purpose have been so constructed that the wear to which they are subjected by use causes them to leak, which leakage can only be remedied by repairs, such as grinding anew or repacking, if packing is used.

It is the object of our invention to obviate this objection by so constructing the valve that it is subject to equal steam or other pressure from the boiler, tank, reservoir, or other vessel, which pressure acts in such a manner as to cause the valve to fit closely to all parts of its seat, irrespective of the amount of wear which takes place; and it consists in constructing the valve of a hollow conical or egg-shaped form, fitting in a seat or cavity of corresponding shape, the surface of the two being ground together to form a steam-tight joint, said valve having a stem solidly affixed to its apex and projecting through the case or seat, with a hand-wheel attached thereto for turning the valve to bring its port coincident with that of the case and open a continuous passage when required, said stem being provided with a coiled spring to retain the valve in its seat when the steam or other pressure is insufficient.

Figure 1:
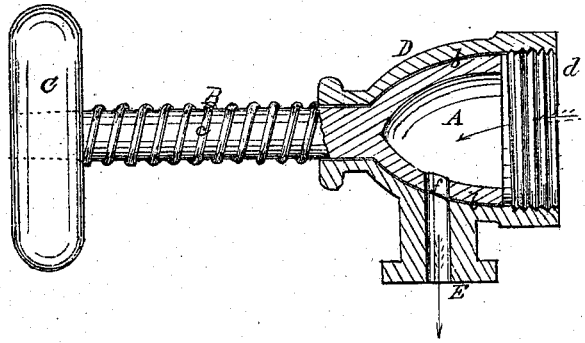
Figure 2:
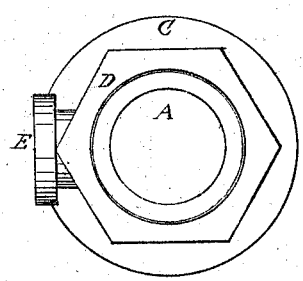
Figure 3:
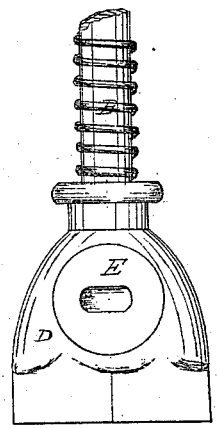

Figure 1 is a longitudinal section of the valve, showing the stem and handle in elevation. Fig. 2 is an end view of the same, showing the interior of the hollow valve.

As shown in the drawing, A is the hollow conical or egg-shaped valve, provided with the stem B and hand-wheel C, or other suitable means for rotating the valve. The valve fits closely in a seat of corresponding shape in the case D, the surfaces being ground together, forming a steam-tight joint, $b\ b$. The case is threaded at $d$ on the interior of the neck to enable it to be screwed onto a plug, nipple, or other coupling, and thereby attached to a boiler or other vessel. An exit-port, E, is provided on one side of the case, and in the valve a corresponding port, $f$, is so arranged that the port E is closed or uncovered by partially rotating the valve on its axis. A coiled spring, $c$, surrounding the stem B, is interposed between the case D and hand-wheel, the office of which is to retain the valve in close contact with the seat when there is not sufficient internal pressure for that purpose.

The walls of the valve A being solid except the small port $f$, an equipoise is produced by the internal pressure of the water acting axially and radially in the cavity, so that any wear of the surfaces is equal in all parts, and hence the valve continues to fit perfectly to its seat so long as its walls remain.

We claim as our invention—

The try-cock or valve herein shown, formed of the hollow egg-shaped plug A, fitting loosely in the correspondingly-formed seat D, and provided with the stem B, reacting spring $c$, and handle C, all constructed and operating as and for the purpose specified.

In witness whereof we have hereunto signed our names in the presence of two subscribing witnesses.

JACOB H. VREELAND.
CHANCY H. LATHROP.

Witnesses:
ALEX. McDONALD,
WILLIAM KAVANAGH.